May 9, 1967
D. MEREDITH
3,318,586
MASS TRANSFER UNIT USING SPACED FLEXIBLE
MATERIALS, AND METHOD OF CONSTRUCTION
Filed Jan. 11, 1965
3 Sheets-Sheet 1
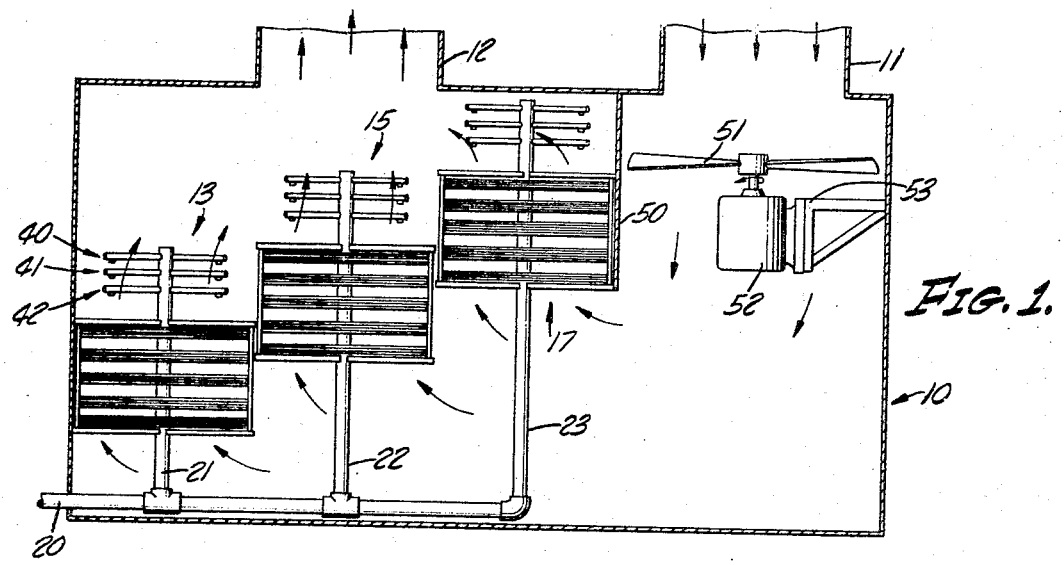
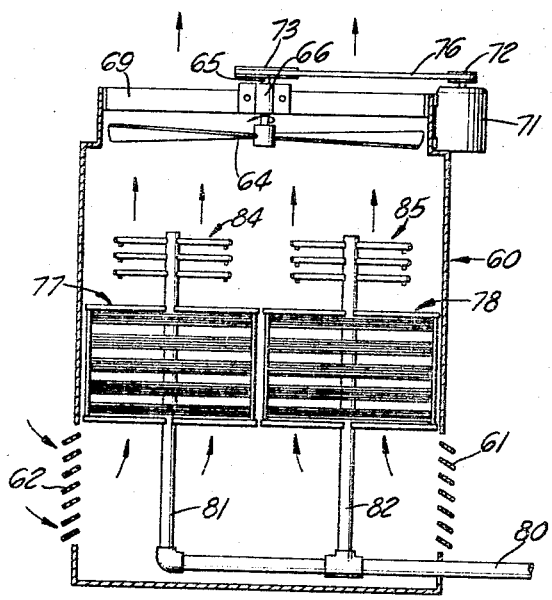
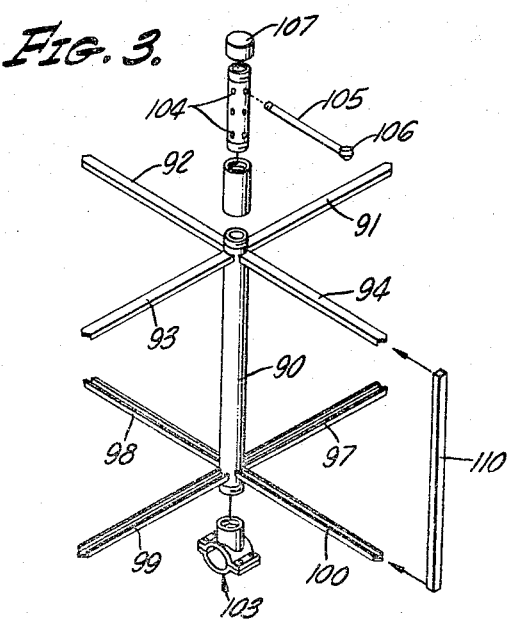
INVENTOR.
DIVEN MEREDITH
BY Henzig and Walsh
ATTORNEYS

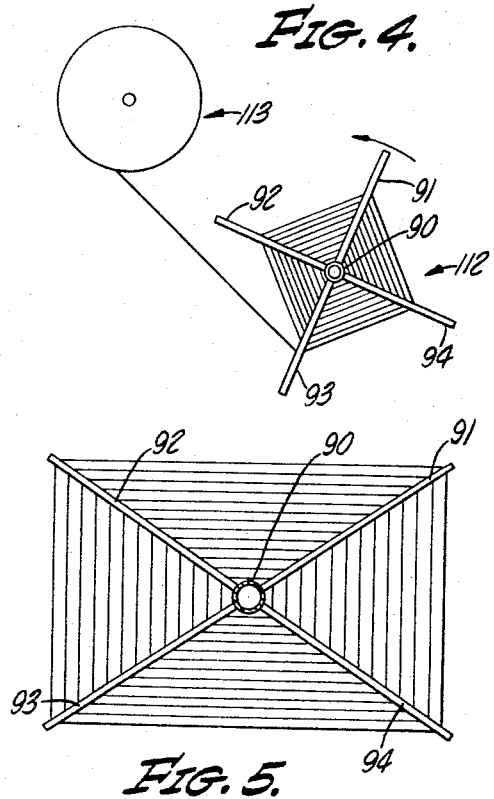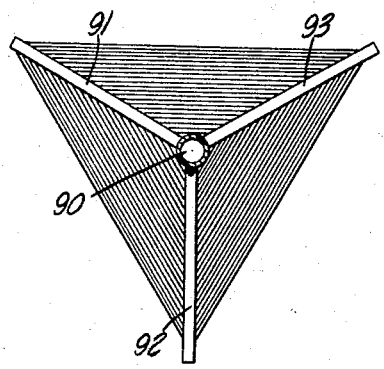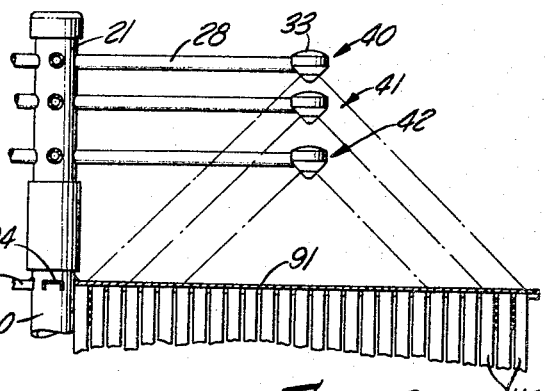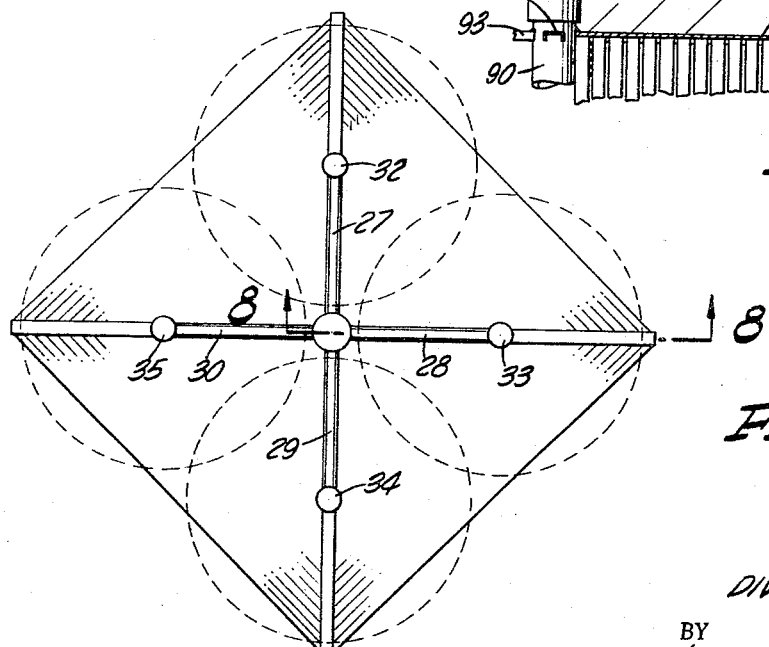

May 9, 1967 D. MEREDITH 3,318,586
MASS TRANSFER UNIT USING SPACED FLEXIBLE
MATERIALS, AND METHOD OF CONSTRUCTION
Filed Jan. 11, 1965 3 Sheets-Sheet 3

INVENTOR.
DIVEN MEREDITH
BY
Herzig and Walsh
ATTORNEYS

United States Patent Office 3,318,586
Patented May 9, 1967

3,318,586
MASS TRANSFER UNIT USING SPACED
FLEXIBLE MATERIALS, AND METHOD
OF CONSTRUCTION
Diven Meredith, 46025 Arabia St.,
Indio, Calif. 92201
Filed Jan. 11, 1965, Ser. No. 424,520
19 Claims. (Cl. 261—30)

This invention relates to a new and improved heat exchanger which has been originated as a result of the necessity of a high efficiency heat exchanger useful in connection with pressure cooling fruit and other produce, and to the method of constructing such heat exchanger. An example of such a pressure cooling system for fruit and the like is shown in prior Patent No. 3,129,071 of Diven Meredith. The heat exchanger of this invention may, however, have many and varied other applications and uses.

"Heat transfer unit," as used herein is meant a device to bring flowing air (gas) and water (liquid), into direct contact one with the other, so as to effect an efficient exchange of sensible and latent heat, and of moisture content. It is to be understood that the herein invention embraces mass transfer in the sense that in gas liquid contact apparatus where the liquid evaporates into the gas, there is a mass transfer.

In the pressure cooling of fruit and the like, it is necessary to perform cooling at tremendously high rates of heat transfer at the outset which diminish (logarithmically) as the process goes on. This creates a need for a high efficiency heat exchanger capable of high performance in a small space and at the same time having the characteristics that heat exchangers can be fabricated easily and economically. Further, it is essential that the air achieve and maintain a maximum of moisture content, which at all times and rates of heat exchange must closely approach 100 percent humidity level.

It has been proposed in the past in connection with this type of cooling to use air flowing through broken chunks of ice in ice bunkers, but this method is subject to the deficiency that performance is lost whenever the ice bunker is not completely filled with ice. This follows from the fact that in order for effective cooling of the air passing over the ice, it must pass over the ice for a linear distance of this order of approximately 16 feet and if the bunker is not filled with ice there is not enough linear passage of air over the ice. Further, due to the isothermal property of ice, there is necessarily a considerable difference in vapor tension between the surface of the ice and the warmer flowing air, resulting in a low moisture content (low humidity percentage) of the air.

It has also been proposed to use a spray system in which water is cooled, for example by being passed over ice or refrigeration coils and then sprayed into a cooling chamber, through which the air is then passed in contact with the water. This is subject to the deficiency, however, that it is very difficult to break up the water into the correct size range in thousandths of an inch, having reference to a size of particles. If the particles are too large the globules of water merely drop to the bottom of the chamber and there is insufficient opportunity for transfer of heat between the air and water. Further, the inherent nature of this type of heat exchanger requires a very large and long chamber and excessive quantities of water at high discharge pressures, which is relatively inefficient and uneconomical. The foregoing background illustrates the need for the invention described herein. Research in the field of heat/mass transfer has revealed that the greatest barrier to the heat transfer occurs at the line of demarcation or separation between the air or gas and water or other liquid, that is, the most resistance to heat or mass transfer is near the air-water interface (surface film) and therefore power is best expended in promoting turbulence and friction near the interface between the air and the water. One of the objects of the herein invention is to realize this end in the most effective and economical way possible.

In one form of the invention, by way of example, to illustrate its principle, it may be formed using a woven industrial fabric which is a fabric providing small interstices; winding this fabric on a central core having extending legs so that the fabric forms essentially a spiral providing parallel spaced layers of the fabric which may have a spacing of ⅜ inch more or less, depending upon the application. The water and air are both passed through this heat exchange core and they may be passed between those layers in parallel or counterflow relationship. What happens in this construction is that the water fills the spaces between interstices in the fabric and thus forms a thin flowing layer on each side with the air passing between two sides so that the barrier to heat transfer between the air and water is minimized. A wettable surface is formed in a most effective and economical way.

A preferred product that may be used is the industrial fabric known as Lumite. This fabric is a polypropylene fabric. This is a product which is woven from plastic fibers. Other materials that can be used in the heat exchanger may be woven of Saran, or nylon fibers. Also metal wire mesh screen can be used, the mesh not being critical. Fabrics referred to are industrial fabrics and are commercially sold for use as shade screens, draperies and the like. This material is a fairly tightly woven fabric although it can be obtained in different weaves and the sizes of the meshes or openings vary upon the tightness of the weave.

The heat exchanger may physically be formed as a square or rectangular unit or other geometrical shape, consisting of a triangle or grouping of triangles. The core may be a central cylindrical or solid member with outwardly radiating members on which the convolutions of the spirally wound fabric material are held.

One of the advantages of the unit of the invention is as compared to a matted fiber unit, or random packed open mesh fabric, is that the later type of units act also in the manner of a filter. Air that is being used to cool fruit products is customarily loaded with dirt and debris and the result is that a unit using a matted fiber or random packed open work cartridge which acts as a filter soon becomes loaded up with debris and is no longer effective for the purpose of heat transfer. Another advantage of the unit of the invention is that the resistance to air flow is considerably less than in other types of units such as rigid member filled or capillary types, as for example, types of units using a matted fiber or random packed open mesh fabric cartridge. The construction of the unit makes possible a predetermined dimensional control of the spacing between the fabric liners wound on the core so that in this way the resistance to air flow is made less.

Another advantage of the invention lies in winding the woven fabric on a core, so that a very accurate and predictable design can very readily be realized to achieve specific engineering requirements and the accomplishment of this being one of the objectives of the invention. Another factor is that the cost of the heat transfer unit is substantially lower than any other heat transfer surface previously known.

Another object of the invention is to realize the above enumerated advantages with a unit occupying a minimum of space and being extremely compact, i.e., many more square feet of heat transfer contact surface can be provided for in the same amount of space, or volume. In other common types of heat transfer units it is usual to use rigid, or semi-rigid, members in the form of slots, baffles, plates, trays, etc. of such materials as wood, cement board, metal, plastic, glass, etc., all of which have a greater inherent thickness than that of a woven fabric. The multiple number of such surfaces required in a heat transfer unit, add greatly to the overall dimensions and weight thereof.

In a further preferred form of heat exchanger unit of the invention, a preferred heat exchange surface is realized by means of a series of independently strung or wound filaments which are parallel and arranged in a series of successive layers or decks so that the water will splash from layer to layer of filaments, and thereby be repeatedly broken into small droplets. An advantage of this arrangement is that the water in the form of small droplets will be repeatedly mixed and remixed with the air. A further advantage will be a tendency for the water flow through the unit to be self-equalizing, caused by the nature of water to cling to a filament and to flow laterally from end to end even though the distribution of the water onto the surface may be unequal. This is not always as true in the case of a woven fabric or solid surface. Also, the weight of the material required is considerably reduced and the unit cost of the material in filament form is less than in a woven fabric form.

A further advantage of this arrangement is the interposition of numerous leading edges normal to the flow of air and water, which thereby induces turbulence in the air stream, as well as effectively scrubbing the surfaces of the filaments, with a resultant high degree of diffusion of liquid to gas.

Further the actual cost of fabrication in the form of labor is substantially less using filaments rather than fabric. A further advantage is that this preferred method of fabrication of the heat exchange unit is the avoidance of "flutter" caused by angular rotation of a long, narrow strip of fabric in a fast moving air stream. Further objects of the invention reside in the realization of the advantages outlined in connection with this preferred form of the unit using filaments.

A further advantage of this arrangement is that a substantially lower pressure is required to cause the air to flow through the heat transfer unit than is required in other surfaces, or in the previously described surface made of vertical parallel spaced fabric layers.

"Filaments" as used herein can be single strands (monofilament) or multiple strands (multifilaments) of such materials as metal, twine, thermoplastics, etc. A preferred material is polypropylene, a thermoplastic, which has outstanding characteristics in the presence of heat, acids, solvents, alkalies, vibration, flexing, oxidation, rot, insects, etc.

Further objects and additional advantages of the invention will become apparent from the following detailed description and annexed drawings wherein:

FIGURE 1 is a cross-sectional view of a cooling tower or cooling unit having heat exchangers of the invention embodied therein;

FIGURE 2 is a sectional view of a modified form of cooling tower or cooling unit having heat exchangers of the invention therein;

FIGURE 3 is a perspective view illustrating the construction of the core of the preferred form of heat exchanger;

FIGURE 4 is a diagrammatic view illustrating winding of the fabric on the core;

FIGURE 5 is a diagrammatic view of a rectangular form of heat exchange unit embodying the invention;

FIGURE 6 is a diagrammatic view of a triangular form of unit.

FIGURE 7 is a plan view illustrating the effective area of the water sprays of a unit of the invention;

FIGURE 8 is a sectional view taken along the line 8—8 of FIGURE 7;

Figure 9:
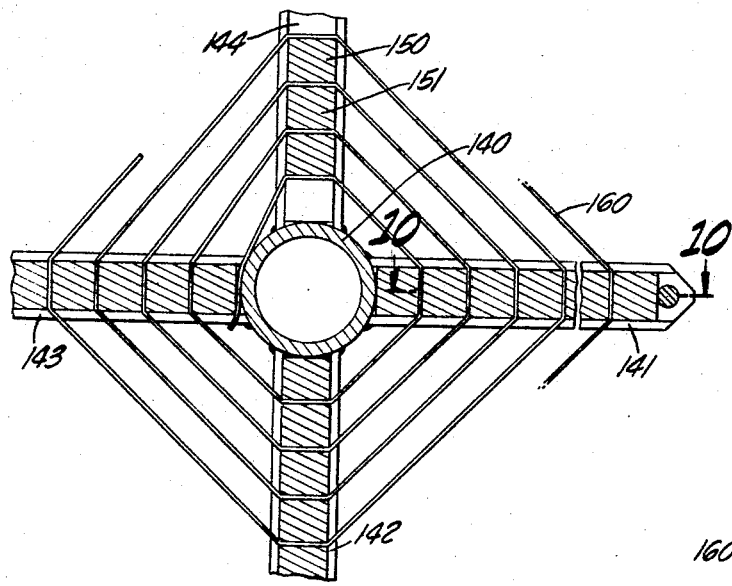
FIGURE 9 is a sectional view of a form of unit using monofilaments.

The invention, as exemplified in the preferred forms described in detail herein is concerned with the subject of fluid contact. Primarily the invention is concerned with an improved construction and/or fabrication of the "contacting surface." The invention is further concerned with the improvement of the performance of the contacting surface. FIGURE 1 illustrates a cooling tower or unit comprising a housing 10 having an inlet conduit 11 and an outlet conduit 12. As shown in FIGURE 1 there are a group of heat exchangers as designated at 13, 15 and 17 at different levels in the housing 10. Numeral 20 designates a conduit having branches 21, 22 and 23 leading to the various heat exchangers for delivering spray water to them. The water spray means are shown more in detail in FIGURE 7. Radially extending tubes or pipes are provided as designated at 27, 28, 29 and 30 in FIGURE 7, having spray nozzles at their ends as designated at 32, 33, 34 and 35. Preferably there are a plurality of arrays of radial tubes and spray nozzles at different levels as designated at 40, 41 and 42 in FIGURE 1. FIGURE 8 is a partial view of the arrangement of arrays 40, 41 and 42. The discharges from the nozzles is illustrated in FIGURE 8 and is such to provide spray areas as indicated by the broken lines in FIGURE 8. This arrangement provides the most effective pattern of distribution of the spray water.

The heat exchangers 13, 15 and 17 of FIGURE 1 are similar in construction as are the arrays of spray nozzles for each exchanger. Numeral 50 designates a baffle in the housing 10 forming a channel in which is provided a circulating fan 51 driven by a motor 52 supported on a bracket 53 within the housing.

FIGURE 2 designates a cooling unit or tower having a modified construction. This unit comprises a housing 60 having a louvered inlet opening 61 and another louvered inlet opening 62 near the bottom of the housing. The air flows upwardly through the housing being circulated by a fan 64 on a shaft 65 journalled in a bearing 66 supported on a transverse member 69. The fan is driven by a motor 71 having a pulley 72 which drives pulley 73 on the shaft 65 through belt 76.

Within the housing 60 are two heat exchangers 77 and 58 which are similar to the heat exchangers of FIGURE 1. Numeral 80 designates an inlet pipe for the spray water having branches 81 and 82. These branch pipes lead to spray assemblies 84 and 85 which are similar to the spray assemblies or arrays as shown in FIGURE 1 and as shown more in detail in FIGURES 7 and 8.

FIGURES 3, 4 and 5 illustrate one manner of construction of the core of the heat exchanger on which is wound the porous non-rigid material. In this figure, numeral 90 designates a central cylindrical member which forms a hub. Attached to this hub is a first array of radially extending support ribs 91, 92, 93 and 94. These ribs are formed in cross-section to provide a radial slot or groove facing downwardly. Lower down on the central member 90 is a second array of similar ribs 97, 98, 99 and 100 similarly having a cross-section to provide a radial slot or groove. At the end of the member 90 is a fitting 103 to which connections may be made for delivery of the spray water.

The upper end of the hub or tube member 90 is provided with orifices as shown at 104 to receive the array of radially extending tubes such as shown at 105 having nozzles 106 at their ends as previously described. A cap 107 may be provided at the upper end of the central tube or hub 90.

In FIGURE 3, numeral 110 designates one of a plurality of spacer members that is used between the ribs, as shown. The ends of this spacer fits into the slot or grooves in opposing ribs such as shown at 94 and 100 so that it is physically retained in the plane of the ribs, but is free to move in a direction parallel to the length of the ribs. The assembly may have various numbers of ribs or legs such as four or three or other number and the configuration may vary as indicated by way of example in FIGURES 4, 5 and 6. The assembly of the hub and the arrays of ribs resembles a reel.

In the fabrication of the heat exchanger the next step is to mount the assembly as shown in FIGURE 3 onto a shaft or between centers or plates which in turn are mounted on shafts in such a manner that the assembly can be held firm or alternatively rotated much in the manner of a reel. The assembly can then be rotated by hand or, preferably in the method of the invention, a power driven means is provided. The next step is to insert a spacer as shown at 110 between two of the oppositely extending legs and then one end of a roll of fabric of the type referred to in the foregoing is attached to this first or starting spacer. Such an assembly is shown in FIGURE 4, numeral 112 designating the core assembly generally with the fabric being wound onto it from a roll of fabric 113. As described, the entire assembly is made to rotate in the manner of a reel and a spacer as shown at 110 is placed in each leg, that is between extending ribs, just ahead of the layer of fabric in such a manner that a continuously wound length of fabric is realized in layers which are accurately spaced in parallel between legs. Alternatively the reel or core may be held fixed and the fabric wound around the reel as the spacers 110 are being inserted to realize a similar result. When the fabric has been completely wound, that is to the ends of the legs or ribs 110, it is again fastened by adhesive, friction nails, staples or alternatively by a sewn pocket to the last spacer 110 and then cut off.

To improve the strength and rigidity of the assembly, the outward ends of each pair of ribs or legs may then be connected by a metal wire or rod having the purpose of preventing the ribs from spreading apart. This construction also imparts considerable stability to the entire assembly.

FIGURE 5 shows a rectangular configuration with arrays of four ribs. FIGURE 6 shows a triangular configuration with arrays of three ribs.

Figure 12:
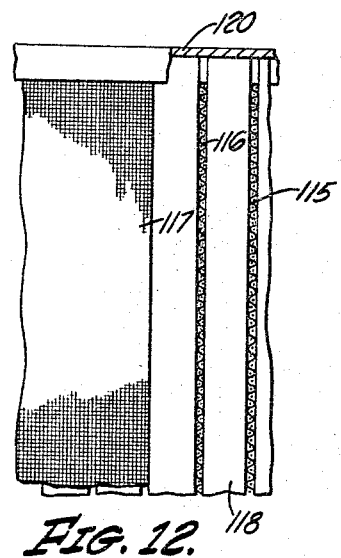
FIGURE 12 is a partial sectional view of a form of unit using fabric not in strip form.

The construction described using full widths of fabric is shown more in detail in FIGURE 12, the wound layers of fabric being designated at 115, 116 and 117. The spacers are shown by way of example at 118 and an upper rib being shown at 120. The fabric can be those referred to or any material wherein there are numerous small perforations through the body of the material such as would be characteristic of a woven fabric or perforated sheet or film material. The material may be any flexible material, organic or inorganic in nature including metal, cloth, plastic, etc.

In a modified form of the invention certain advantageous results are realized by creating interrupted contact surfaces in the fabric, the interruptions being at a right angle to the direction of flow of the liquid over the fabric surfaces. Such a construction is illustrated in FIGURE 12 wherein the fabric is similarly wound but is in the form of interrupted strips as designated at 122, 123, 124, and 125. The strips are similarly wound and spaced by spacers as shown at 127, and 128 so that the fabric rather than being in a form of spaced continuous surfaces is in the form of strips that are spaced by the spacers and the strips being spaced from each other vertically as illustrated by the spacing of strips 122 to 125 and strips 130, 131, 132 and 133. Certain advantages accrue from this type of construction. Among these are that the natural oscillating and flexing movement of a narrow strip which is induced by contact with the flowing liquid and gases creates a continual turbulence and thereby results in a better inter-mixing of the flowing gas and liquid. Further a leading edge of the fabric at a slot as presented to the flowing gas creates a disturbance thereof resulting in an increase of turbulence. Also, the frequent interrupting of the film of liquid flowing over the surfaces causes a physical remixing of the liquid within itself and also to disturb the tendency of the liquid to attain a laminer type of flow.

Figure 11:
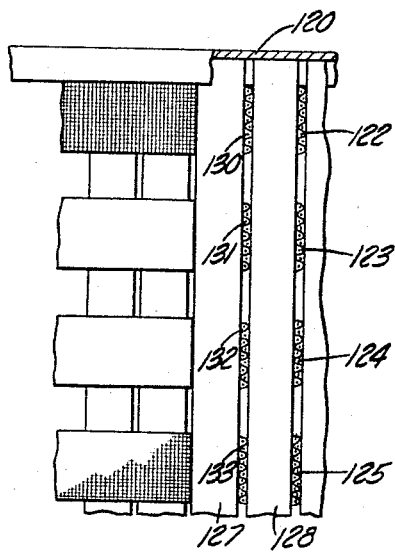
FIGURE 11 is a sectional view of the unit using spaced fabric strips forming the wettable surface.

An interrupted surface as described can be realized or obtained by various fabricating techniques and combinations thereof. The winding or reeling of the tapes may be similar to the method described above, i.e., by simultaneously winding a number of separate tapes or strips laid side by side to produce a structure as shown in FIGURE 11. On the other hand the technique may be used of winding a single (or several) continuous sheet of fabric and simultaneously slitting this fabric material by means of a plurality of cutting edges arranged side by side to cut at the same time. A further technique is to wind a single (or several) continuous sheet of fabric and simultaneously causing a number of cutting edges arranged side by side to penetrate (impale) and slit the fabric for a predetermined length; the cutting edges then being withdrawn from the fabric for such time as is required for the fabric to move past the point of penetration by a predetermined distance and then the cutting edges once again being caused to penetrate and slit the fabric.

FIG. 11 illustrates the foregoing spaced tape or strip type of construction.

Figure 10:
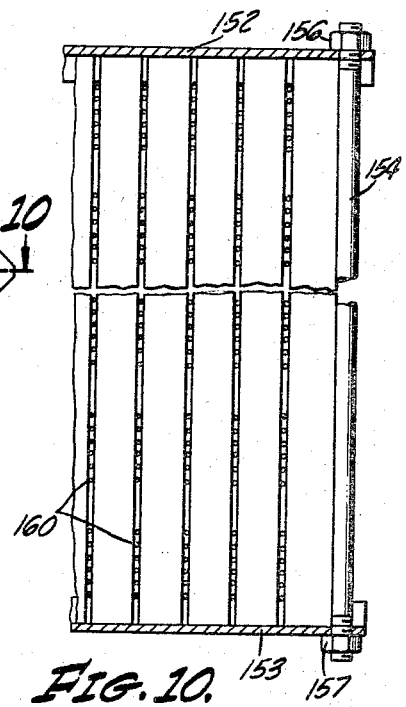
FIGURE 10 is a sectional view taken along the line 10—10 of FIGURE 9.

FIGURES 9 and 10 illustrate a further modified form of the invention which is different principally in that neither a continuous fabric surface or interrupted fabric surface is used, but rather filaments, preferably of a polypropylene material. This form of construction has a number of objectives and advantages from the standpoint of the method of fabrication and from the standpoint of the "heat transfer." From the standpoint of economics this type of fabrication of a "cell" or "heat exchange unit" may reduce the cost by thirty to fifty percent depending on the size of filament used. This type of construction makes it possible to utilize the polypropylene filament, directly after processing by the "converters," that is the industrialists who convert the raw materials into filaments. Such processors are intermediates to the "product manufacturers" who process the filaments into fabrics or other products. A shorter economic chain is realized by using the filaments direct from the converters.

Further, by using the parallel filaments only, the "woof" or "weft" filaments in a woven fabric are eliminated entirely with a considerable saving in material used, as well as the cost of weaving. In addition to these economic factors in the chain, enough rolls of filaments can be set up at one time to wind several hundred or more heat transfer units or "surface cells" thereby reducing the labor involved in using rolls of fabric which in the best of circumstances can only carry enough material for a few units or cells. The cost of reslitting is also eliminated and further there is no material waste which otherwise occurs at the roll ends. The higher freight cost of the heavier material is avoided as is the long lead time between order and receiving an order or fabric due to the time required for weaving. Also, the extremely high inventory value of the large minimum fabric orders required is reduced.

From the standpoint of heat exchange unit design there are other advantages including omission of flutter, better water distribution, better heat/mass transfer; the individual filaments have a greater elastic effect thus offsetting somewhat the tendency of the fabric to become slack. Further the tendency of a slack fabric to adhere to the one along side of it, due to the suction effect of water layer against water layer is entirely offset. Furthermore, the aforestated advantage of filaments allow a considerable freedom of design such as longer spans between supports and hence larger cells.

Statistically the failure or breaking of a strand of filament from one cause or another will have a far less effect on the overall performance of a cell than the failure of a strip of fabric.

The construction shown in FIGURES 9 and 10 embodies a core 140 in the form of a cylindrical member constituting a hub. Radially extending ribs or legs are provided in arrays as shown at 141, 142, 143 and 144. The spacers are designated by way of example at 150 and 151 being fitted into the slots or grooves in upper and lower radial legs or ribs as shown in FIGURE 10. The lower rib in FIGURE 10 is designated at 153 and the upper at 152. Extending between the ends of the opposite legs or ribs as shown by way of example at 154 in FIGURE 10 is a rod threaded at the ends, and secured by nuts as shown at 156 and 157. This construction as previously described stabilizes the overall assembly and prevents the upper and lower ribs or legs from spreading apart.

The winding technique is similar to that previously described, a plurality of filaments as designated at 160 being serially or simultaneously wound from spools or reels onto the core assembly which is rotated in the manner of a reel as previously described.

With respect to all of the forms of the invention described in the foregoing a number of advantages are inherently present. With respect to a "tray" or "unit of heat exchange surface" the arrangement and sequence of assembly requires very little labor, a minimum of parts and lends itself readily to automatic machine assembly. Any specified arrangement of the fabric width, of the regular spacing between the fabric layers, of a size of a "tray" or assembly is readily achieved with only a change in dimensions of the essential elements used. The stresses and working conditions imposed on the materials used in the assembly are favorable to the best physical properties and form of the material used for both the manufacturing and service requirements.

The hub or center of the core is the essential structural item and may be made of wood, steel, plastic or molded plastic. The ribs act primarily as guides and retaining members for the fabric. They are preferably of a rigid material such as wood, redwood, metal, plastic, asbestos, cement board, etc. The spacers function primarily as compression members.

As described, the fabric may be used in the form of a full width or as a series of parallel ribbons separated by an open space between them. This allows the user to select the specific balance of engineering features between the maximum of surface ratio per unit volume of "fill" to the volumetric flow of the air and free falling water.

The arrangement and assembly of the various elements which are used in making this "fill" is such that the work of assembling can be done manually or by an automatic machine with only a very minimum of manual assistance.

"Surface," or "contacting surface," where used herein refers to both the layer (film) of water flowing on and over a fixed surface of fabric, filament, rigid material, etc., and to the exterior surface of the free falling droplets of water.

The ratio of area of "contacting surface" to unit volume is very high due to the arrangement and use of the materials which have a very high ratio of surface to unit volume. This feature permits the design of smaller equipment to accomplish the same results. Also, it permits, the design of a cross-section area of air or gas flow through the "fill" section of the equipment which is of approximately the same order as the cross-section of the ducts entering and leaving the equipment. This results in a more or less uniform unit mass velocity of the gas which results in a lower differential pressure required to induce flow. This lower differential pressure permits less fan effort, or power requirements.

The liquid and gas flow through the fill is parallel to, onto, and through the channels or spaces between the parallel surfaces of the fabric. The width of these channels is controlled by the cross section dimension of the spacers and the depth or fill height by the length of the hub and spacers.

These channels being of regular dimension, open and unobstructed, present a low resistance path to the flow of the gas and liquids in relation to the contact surface and also do not retract and hold or retain foreign matter out of a liquid nature.

By the use of a hub or center member of hollow construction such as a pipe, a hub can be used as the conductor for the liquid to be distributed over the surface or fill.

From the foregoing those skilled in the art will readily understand the invention and will appreciate its advantages as outlined herein as well as its many other advantages inherent in the construction and method. The foregoing disclosure is representative of preferred forms of the invention and is to be interpreted in an illustrative rather than a limiting sense, the invention to be accorded the full scope of the claims appended hereto.

What is claimed is:

1. A heat exchanger comprising a central core having at least two arrays of radially extending members, a plurality of spacer members extending axially between the radial members, flexible strand material wound to form layers around the core, the layers being spaced apart by adjacent spacer members so that radial spaces are formed between the flexible material, means to apply liquid to an end of the core, the flexible material in wound position having spaces between strands of material adapted to hold a liquid flowing in a thin layer thereon by capillary attraction to form liquid surfaces adapted to be contacted by gas, and means to provide an axial flow of gas between the spaced contacting surfaces formed by the layers.

2. A structure as in claim 1 wherein said radial members are constructed to allow radial movement of the said spacer members in planes including an axis of the said core.

3. A heat exchanger as in claim 2 wherein the said radial members and spacer members are provided with tongue and groove configurations to allow sliding radial movement of the spacer members.

4. A heat exchanger as in claim 2 including means secured between outer ends of upper and lower radial members to stabilize the structure of the heat exchanger.

5. A structure as in claim 1 wherein the flexible material is in the form of a continuous flexible sheet wound to provide spaced parallel contact surfaces of the said sheet material.

6. A heat exchanger as in claim 1 wherein the flexible material is in the form of a plurality of separate parallel ribbons which are spaced apart axially as respects the core of the heat exchanger.

7. A heat exchanger as in claim 1 wherein the flexible material is in the form of filaments wound so as to leave axial and radial spaces between the filaments whereby to cause the liquid to pass over and between axially and radially spaced filaments and to form liquid surfaces adapted to be contacted by gas, and to traverse on and along the filaments and thereby distribute itself uniformly.

8. The structure as in claim 1 including spray nozzles positioned over the heat exchanger structure for spraying liquid thereon, said nozzles including a plurality of vertically spaced nozzles to provide progressively varying areas of spray distribution.

9. A construction as in claim 1 wherein the said core is in the form of a hollow tubular member, means for conducting a spray liquid to said hollow tubular member, and means at the end of said tubular member for spraying liquid over the heat exchanger.

10. A construction as in claim 9 including a plurality of spray nozzles positioned over the heat exchanger and communicating with said hollow core, said spray nozzles being positioned at different levels whereby to provide for progressively varying areas of water distribution.

11. A method of construction of heat exchangers comprising attaching an upper array of radial rib members to a central core, and attaching a lower complementary array of radial rib members to the central axial core, winding a flexible liquid gas contact surface forming material around the central core between the upper and lower arrays of radial members to form layers, and inserting axial spacer members between adjacent layers of material between upper and lower complementary radial rib members whereby the wound material forms layers providing spaces between strands thereof such that by capillary attraction liquid is held in a film, forming spaced liquid and gas contact surfaces.

12. A method as in claim 11 including the step of winding a flexible contact surface forming material in a continuous sheet whereby the sheets form parallel spaced layers of material.

13. A method as in claim 11 comprising the step of winding the flexible contact surface forming material in the form of a plurality of ribbons and winding the said ribbons so as to form vertical spaces between ribbons in each layer thereof.

14. A method as in claim 11 including the step of winding the flexible material in the form of filaments whereas to leave axial and radial spaces between the filaments whereby to cause the liquid to pass over and between the filaments, and to pass from layer to layer successively.

15. A mass transfer device comprising a central core having at least two arrays of radially extending members, a plurality of spacer members extending axially between the radial members, flexible strand material wound to form layers around the core, the layers being spaced apart by the spacer members so that radial spaces are formed between the flexible material, means to apply liquid to an end of the core, and means to provide an axial flow of gas between the spaced liquid contacting surfaces formed by the layers.

16. A mass transfer unit as in claim 15, wherein the core, radially extending members and spacer members are configurated to hold the flexible strand material in tension.

17. A mass transfer unit as in claim 16, wherein the configuration of the core, radial members, and spacer members is such as to hold the flexible strand material in straight substantially horizontal reaches.

18. A mass transfer unit as in claim 15, wherein the flexible material is in the form of generally horizontal elements spaced apart vertically to provide a plurality of uninterrupted leading edges arranged generally vertically over each other.

19. A mass transfer unit as in claim 18, wherein the strand material is in the form of individual filaments.

References Cited by the Examiner

UNITED STATES PATENTS

| 633,287 | 9/1899 | Lewis et al. | 261—102 X |
|---|---|---|---|
| 803,925 | 11/1905 | Ohde | 261—103 |
| 1,178,934 | 4/1916 | Mangelsdorff | 261—101 |
| 1,650,140 | 11/1927 | Kuhni | 261—112 |
| 2,054,809 | 9/1936 | Fleisher | 261—112 |
| 2,404,789 | 7/1946 | Burk et al. | 261—112 |
| 2,490,079 | 12/1949 | Melvill. | |
| 2,565,221 | 8/1951 | Gaugler | 261—104 X |
| 2,615,699 | 10/1952 | Dixon. | |
| 3,113,102 | 12/1963 | Schulze | 261—103 X |
| 3,118,498 | 1/1964 | Bergdoll et al. | 165—10 X |

FOREIGN PATENTS

| 4,613 of 1910 | 2/1911 | Great Britain. |
|---|---|---|
| 110,275 | 10/1917 | Great Britain. |

HARRY B. THORNTON, *Primary Examiner.*

T. R. MILES, *Assistant Examiner.*